US006625595B1

(12) United States Patent
Anderson et al.

(10) Patent No.: US 6,625,595 B1
(45) Date of Patent: Sep. 23, 2003

(54) METHOD AND SYSTEM FOR SELECTIVELY PRESENTING DATABASE RESULTS IN AN INFORMATION RETRIEVAL SYSTEM

(75) Inventors: David J. Anderson, Lawrenceville, GA (US); Senis Busayapongchai, Tucker, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 326 days.

(21) Appl. No.: 09/610,333

(22) Filed: Jul. 5, 2000

(51) Int. Cl.[7] .............................................. G06F 17/30
(52) U.S. Cl. ............................... 707/3; 10/100; 10/102; 379/88.17
(58) Field of Search .......................... 707/2, 3, 10, 104, 707/100, 102, 1; 379/88.17, 67, 114.24, 207.12, 219, 93.2, 84

(56) References Cited

U.S. PATENT DOCUMENTS

| | | | | |
|---|---|---|---|---|
| 4,757,267 A | * | 7/1988 | Riskin | 379/113 |
| 5,878,423 A | | 3/1999 | Anderson et al. | |
| 5,924,090 A | * | 7/1999 | Krellenstein | 707/5 |
| 5,987,408 A | * | 11/1999 | Gupta | 704/231 |
| 6,018,736 A | * | 1/2000 | Gilai et al. | 704/239 |
| 6,038,560 A | * | 3/2000 | Wical | 706/50 |
| 6,173,279 B1 | * | 1/2001 | Levin et al. | 707/102 |
| 6,189,003 B1 | * | 2/2001 | Leal | 707/10 |
| 6,256,630 B1 | * | 7/2001 | Gilai et al. | 704/239 |
| 6,421,672 B1 | * | 7/2002 | McAllister et al. | 704/246 |

OTHER PUBLICATIONS

Atlanta Yellow Pages, "Info by Voice", pp. 91–96.
The Times–Picayune New Orleans, Bly, Laura "Travelers use phones to access the Internet", Jan. 21, 2001.
Speech Technology, "Implementing The Portal Involves Company Partnerships", Sep./Oct. 2000.
Miller, Daniel N. "The Rec'ing Crew at BellSouth IntelliVentures", Dec. 5, 1997.
Miller, Daniel N. "The Kelsey Report", pp. 1–5, Jul. 3, 1996.
Fortune, Nee, Eric "Who Wants To Talk To The Web?", Nov. 13, 2000/.
The Standard Intelligence For The Internet Economy, available at http://www.thestandard.com/article/display/0,115,18154,00.html?nrc=nhsr.
The Atlanta Journal Constitution, Kanell, Michael, E. "BellSouth's free phone servie mimics Net", Jan. 19, 2000.
www.mapquest.com, Feb. 27, 2002.
www.bevocal.com, "Telecom Solutions", Dec. 11, 2001.
www.signalsoft.com, "About Signalsoft," Dec. 11, 2001.
Hamilton, Anita, "Speak Up, Will Ya?", *Time*, (Aug. 7, 2000).
www.myaudiopoint.com (Nov. 2001).

* cited by examiner

*Primary Examiner*—Jean M. Corrielus
(74) *Attorney, Agent, or Firm*—Shaw Pittman LLP (57) ABSTRACT

An information retrieval system is described that dynamically prioritizes search request results prior to output to a user. When a database search yields multiple hits, the results are first categorized into a series of groups. Categories are determined from any number of different factors, such as geographical locations of the search results, amenities, hours of operation, etc. For each category, the search results can be parsed into groups within the category. The results are first reported to the user in general terms, as a number of search results in each of the groups. The user is prompted to select the group that is of most interest, and the portion of the individual search results that are within the selected group are reported.

23 Claims, 8 Drawing Sheets

| TYPE OF BUSINESS | NAME | ADDRESS | PHONE | HOURS | PRICES | FEATURES | SPECIALTY | LOCATION |
|---|---|---|---|---|---|---|---|---|
| RESTAURANT/BAR DANCE CLUB/ BANQUET FACILITY/ CATERER/EVENT SITE | JOE'S AMERICAN FOOD | 1121 MAIN ST. | (404)371-1234 | 9AM-MIDNIGHT 7 DAYS/WEEK | $8-$17 ENTREES | DANCING/ RESERVATIONS REQUIRED/NO SMOKING SECTION/AMERICAN FOOD | CRAB CAKES | NEAR BUCKHEAD MALL |
| RESTAURANT | LEE'S CHINESE FOOD | 15 JEFFERSON ST. | (404)369-4321 | 11:30AM-8PM | $7.50-$11.50 | CHINESE FOOD | SPRING ROLLS | NEAR DOWNTOWN |
| RESTAURANT | BAGHDADI CAFE | 20 SUN BLVD. | (404)775-1321 | 2PM-4PM | $2.50-$5.50 | EGYPTIAN CUISINE | - | NEAR DOWNTOWN |
| GASOLINE STATION | AMOCON | 18 JEFFERSON ST. | (404)777-5555 | 6AM-12AM | $1.68 $1.75 $1.88 | MINI MARKET/ FULL SERVICE/ DIESEL | - | NEAR DOWNTOWN |
| DEPARTMENT STORE | WOODMAN'S | 3 N ST. | (404)663-8661 | 10AM-9PM | - | CLOTHING/ FASHION ACCESSORIES/SHOES | - | NEAR LINCOLN MALL |
| GASOLINE STATION | EXXONI | 751 P ST. | (404)799-9350 | 5AM-1AM | $1.55 $1.60 $1.65 | - | - | WOOTON |
| PHARMACY | CVSO | 950 F ST. | (404)321-1239 | 10AM-10PM | - | DRIVE THRU WINDOW/RAPID REFILL | BOBS AETNEE HEALTH UNIT | NEAR LINCOLN MALL |
| RESTAURANT/BAR | SAM'S BAR | 1 PENT ST. | (404)333-1649 | 5PM-1AM | - | HOME BREWED BEER | HOME BREWED BEER | NEAR MLK HIGHWAY |
| PHARMACY | WRITE-AID | 5 SHAW AVE | (404)392-6333 | 9AM-9PM | - | - | - | NEAR DOWN-TOWN |
| FOOD MARKET | DON'S MEATS | 10 PENN RD. | (404)393-6349 | 10AM-6PM | - | CARRYOUT COOKED, UNCOOKED | PRIME RIB | NEAR BUCKHEAD MALL |

| TYPE | NAME | ADDR | PHONE | HOURS | PRICES | FEATURES | SPECIALTY | LOCATION |
|---|---|---|---|---|---|---|---|---|
| RESTAURANT | JOE'S AMERICAN FOOD | ? | ? | 9AM-MIDNIGHT | $8-$17 | DANCING; RESERVATIONS; NO SMOKING; DINER | CRAB CAKES | BUCKHEAD |
| RESTAURANT | SANDY SPRINGS | ? | ? | 5-9PM | $18-$25 | ELEGANT DINING | PRIME RIBS | BUCKHEAD |
| RESTAURANT | MC FOOD | ? | ? | 6AM-1AM | $1-$4 | FAST FOOD | BURGERS | BUCKHEAD |
| RESTAURANT | BURGER QUEEN | ? | ? | 5AM-12AM | $2-$5 | FAST FOOD | CHEESE-BURGERS | BUCKHEAD |
| RESTAURANT | LE' TODE FRANCENE | ? | ? | 5:30PM-8:30PM | $22-$50 | FINE DINING | FILET MIGNON | BUCKHEAD |

*FIG. 6*

AMERICAN RESTAURANT

- REGIONAL LOCATION
    - NEAR BUCKHEAD MALL
    - NEAR DOWNTOWN
    - NEAR LINCOLN MALL

- HOURS OF OPERATION
    - OPEN PAST MIDNIGHT
    - CLOSES BEFORE 11
    - CLOSES BEFORE 10

- SPECIALTY
    - CRAB CAKES
    - BURGERS
    - FINE DINING
    - FAST FOOD

- PRICES
    - INEXPENSIVE
    - MODERATE
    - EXPENSIVE

- TYPE OF RESTAURANT
    - DINER
    - TAKE OUT
    - DRIVE THROUGH
    - TRADITIONAL

- AMENITIES
    - RIVER VIEW
    - PIANO BAR

*FIG. 7*

METHOD AND SYSTEM FOR SELECTIVELY PRESENTING DATABASE RESULTS IN AN INFORMATION RETRIEVAL SYSTEM

FIELD OF THE INVENTION

The present invention relates to information retrieval systems, and more particularly, to dynamic processing of search results to be presented to a user in response to a data inquiry.

BACKGROUND OF THE INVENTION

In our modern, fast-paced society, consumers are increasingly relying upon directory assistance systems instead of conventional telephone books for quick access to directory information and guidance concerning local retail establishments or other popular destinations. Whether by use of landline or mobile telephones, directory assistance systems obviate the inconveniences of physically locating an appropriate telephone book and manually researching through the book to find a desired telephone number to call. Further, directory assistance systems are particularly useful for mobile telephone users seeking to place a telephone call while operating an automobile or otherwise being in transit.

Conventional telephone directory assistance systems operated by local telephone companies have been in place in some format for over a century, before telephones even incorporated dialing mechanisms. In the modern versions of conventional telephone directory assistance, a computerized voice prompts a user to first identify a city and state and then provide a name of a person or a business. If the information can be recognized and identified through speech recognition and/or natural language understanding software, the requested telephone number is provided through a computerized voice. Otherwise, a human telephone operator asks for additional information, such as spelling or a street address, and then performs a database search. While this service is quite useful, it is generally limited to either providing telephone numbers or directly connecting the caller to the requested person or business.

Recently, directory assistance systems, particularly those designed for use with mobile telephones, have incorporated additional features to facilitate searching for other types of information concerning retail business establishments. For example, directory assistance operators can provide information concerning the weather, movie listings, restaurants of a particular cuisine located in the vicinity, etc. These systems have proven to be quite popular. However, their operation requires direct interaction with a human operator, which is expensive.

As speech recognition technology continually improves, applications for utilizing speech recognition for information retrieval systems are becoming a more popular resource for consumers. As an example, "Info-by-voice for Atlanta" is an automated, voice-operated telephone directory that is available to consumers in the metropolitan area surrounding Atlanta, Georgia, who wish to obtain directory assistance information concerning topics such as restaurants, traffic information, stock quotes, weather, sports, and business news. By using this service, a caller provides information in response to a series of questions from a synthesized voice, and then receives a list of names and contact information for businesses matching the desired criteria. For example, if a caller submitted a request for Chinese restaurants, the system might identify five places for the caller to consider. As can be readily seen, an audio information retrieval directory can provide a useful and convenient resource for local and topical information.

Developments in dynamic processing of an index in a database for information retrieval systems are described in U.S. Pat. No. 5,878,423 to Anderson et al., issued Mar. 2, 1999 ("the '423 patent"), which is incorporated herein by reference. The '423 patent discloses a method and system for dynamically processing an index to create a set of questions used when processing a data query. An index is a guide that is processed and used to find information from within a database, such as a database of classified advertising information. The set of questions are arranged according to a question set order associated with the index, and the set of questions only includes those questions that trigger responses that are found within the index.

While information retrieval systems such as those described in the '423 patent have become more efficient in processing data inquiries and retrieving database information, there are several difficulties that are often encountered when supplying the information to a caller. Even if a caller is fully concentrating on the telephone call, it is difficult for the caller to retain more than limited amounts of the information that was provided orally by the information retrieval system. If the system provides as output a list of several business names that match the caller's request, confusion is created as the caller attempts to remember all of the information. Considering that callers typically access such systems while operating a motor vehicle or are otherwise in transit, there is a need to quickly and efficiently communicate the most pertinent information to the user. Accordingly, there is a need for a system and method of formatting the results generated by an information retrieval system to provide usable and easily discernable information.

SUMMARY OF THE INVENTION

The present invention is directed to an information retrieval system that dynamically prioritizes search request results prior to an output to a user, thereby providing guidance to the user. When a database search yields multiple hits that are collectively too numerous to present the user, the results are organized into groupings pertaining to a category to be selected from a plurality of categories. Each possible category relates to a different aspect that differentiates between the search results, such as geographical location, hours of operation, amenities, etc. The available categories are ranked according to a default priority. The system selects a category that is of the highest priority and will provide a reasonable distribution of the search results. Once the category is determined, the search results are then divided into groups corresponding to the category. The groups within each category are criteria associated with the category. For example, if the category is "geographical location," the groups in the category are likely to be different geographical locations, and the search results are therefore divided and grouped according to their respective geographical locations. The user can choose to receive the search results in the group that is of most interest. The user also has an option to reconfigure the output according to a different category.

When a user places a call into the information retrieval system, a series of questions are presented to the user, and responses are solicited and interpreted through voice recognition and/or natural language understanding software to process an information request. The system performs a search request in the database based upon the recognized responses to the presented questions. If the number of hits from the search request is too large to be easily comprehended by the caller, the system continues to prompt the user for more responses in order to narrow the search. Upon fielding a reasonable number of search results, the system determines whether all of the search results should be reported to the user. If there is only a small number of search results, these are output to the user.

When there is more than a predetermined number of useful search results, the system then selects a category by which the output can be organized. The possible categories are weighted or prioritized in an order according to the category that is likely to be of the most significance to the user and provides an acceptable result distribution. The results are then divided into groups pertaining to the highest priority category. The names of the groups are then provided to the user, and the user selects a group in the category.

If the number of search results in the selected group is too numerous to be easily presented to the user, the system can then select another category, and divide the search results from the selected group further into new groups corresponding to the next selected category. This process is repeated until the search results in a selected group are of a reasonable number that can be presented to the user.

It is the object of the present invention to provide a method for selectively presenting output from a database search in a database system. The information retrieval system generates a list of categories by which a plurality of database search results can be sorted, wherein each category includes a plurality of groups, and each of the plurality of database search results is associated with one of the groups in each category. A default priority is assigned for each of the categories. The system receives an unsorted list of database search results, selects a category from the list of categories having the highest default priority, and sorts the search results into the respective groups associated with the selected category. In an alternative embodiment, the method according to the present invention eliminates categories from the list of categories in which all of the search results in the unsorted list of database search results would be sorted into the same group.

It is another object of the present invention to provide an information retrieval system for providing information about a plurality of items of interest in response to a search request. A database records unit stores a plurality of information about a plurality of items of interest. A question generator table generates a set of questions to prompt a user to provide search request parameters for searching the database records unit. A database search engine searches the database records unit according to a search request. A categories generator table generates a list of categories by which search results from the database records unit can be sorted by criteria associated with each category. The search results are output in a format sorted according to criteria in a category selected from the list of categories.

The present invention is also directed to a method for sorting search results according to geographical regions within the local geographical area, in an information retrieval system for providing information in response to search requests for businesses or other places of interest in a local geographical area. A list of geographical regions in a local geographical area are stored in a first database. The search results are then grouped according to the geographical region from the list of geographical regions that corresponds to a geographical location associated with each of the search results.

The present invention is further directed to a method for sorting search results into groups according to a category selected from a plurality of categories, in an information retrieval system for providing information in response to search requests for businesses or other places of interest in a local geographical area. A list of categories by which a plurality of search results can be sorted is stored, wherein each category is associated with at least one type of business or place of interest. The system determines a type of business or place of interest associated with each of the search results. A grouping of categories is generated from the list of categories that are associated with the same type of business or place of interest as the search results. A category is then selected from the grouping of categories, and the search results are sorted into groups associated with the selected category.

BRIEF DESCRIPTION OF THE FIGURES

FIG. 5 is a flow diagram of a set of questions generated during a dialogue for conducting the steps of the database search in FIG. 3a.

DETAILED DESCRIPTION OF THE PREFERRED EMBODIMENTS

Figure 1:
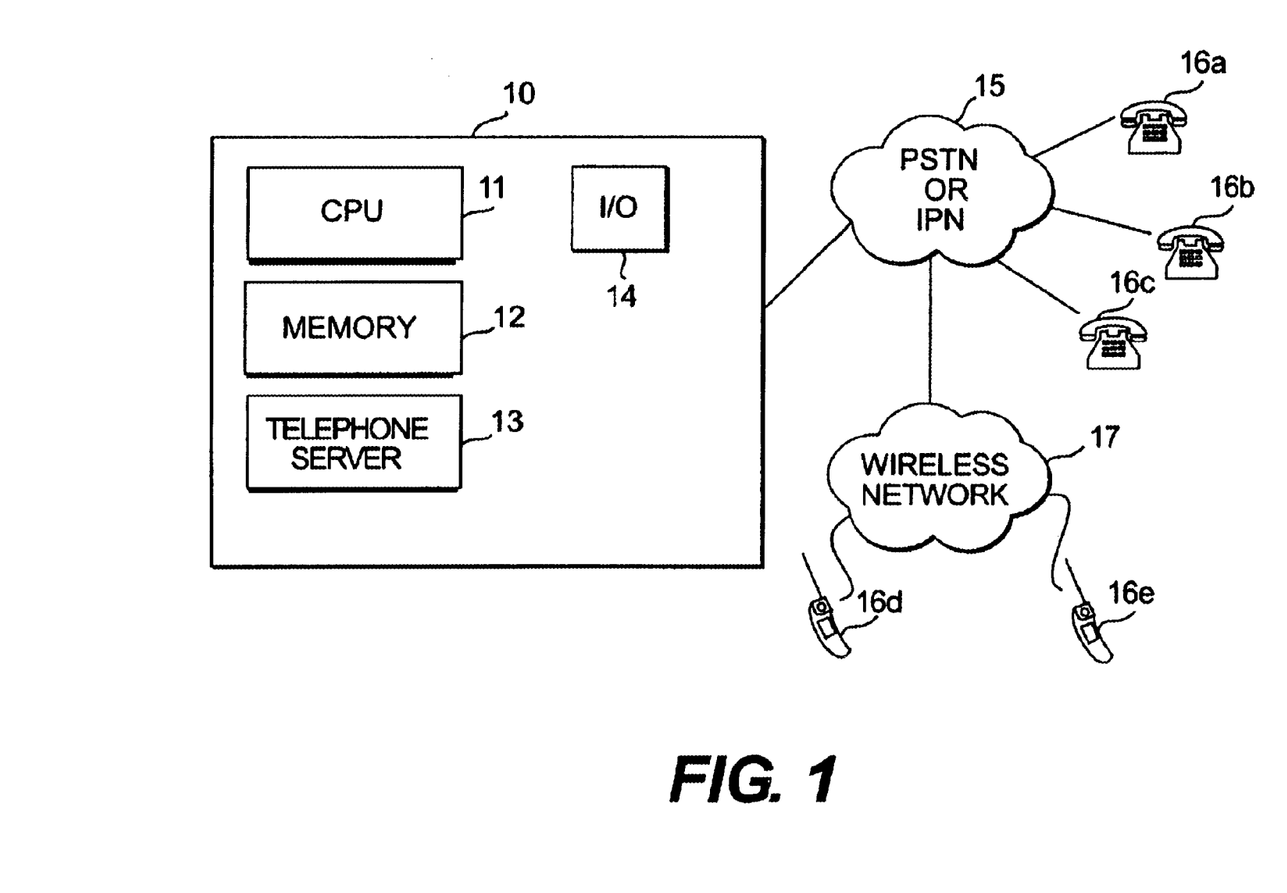
FIG. 1 is a schematic diagram of a computer system for use with an information retrieval system of the preferred embodiment of the present invention.

The present invention is directed to a system and methods for organizing and categorizing audio information responses in an information retrieval system. FIG. 1 is a schematic diagram of an exemplary computer system 10 for implementing the information retrieval system of the present invention. The computer system 10 includes processor 11, system memory 12, and telephony front end server 13. Information is input or output from the computer system 10 through I/O interface 14 to conventional hard drives or network connectivity. The telephony front end server 13 acts as a communications interface connected to a conventional public switched telephone network (PSTN) or IP Network (IPN) 15 to provide a connection between the computer system at I/O interface 14 and a conventional landline or wireless mobile telephone. Through this configuration, a user can interact with the computer system 10 through voice responses via conventional telephones 16a–16c. The public switched telephone network 15 is connected to a wireless communications network 17, which in turn communicates with mobile telephones 16d–16e, or any other type of mobile communications unit.

Figure 2:
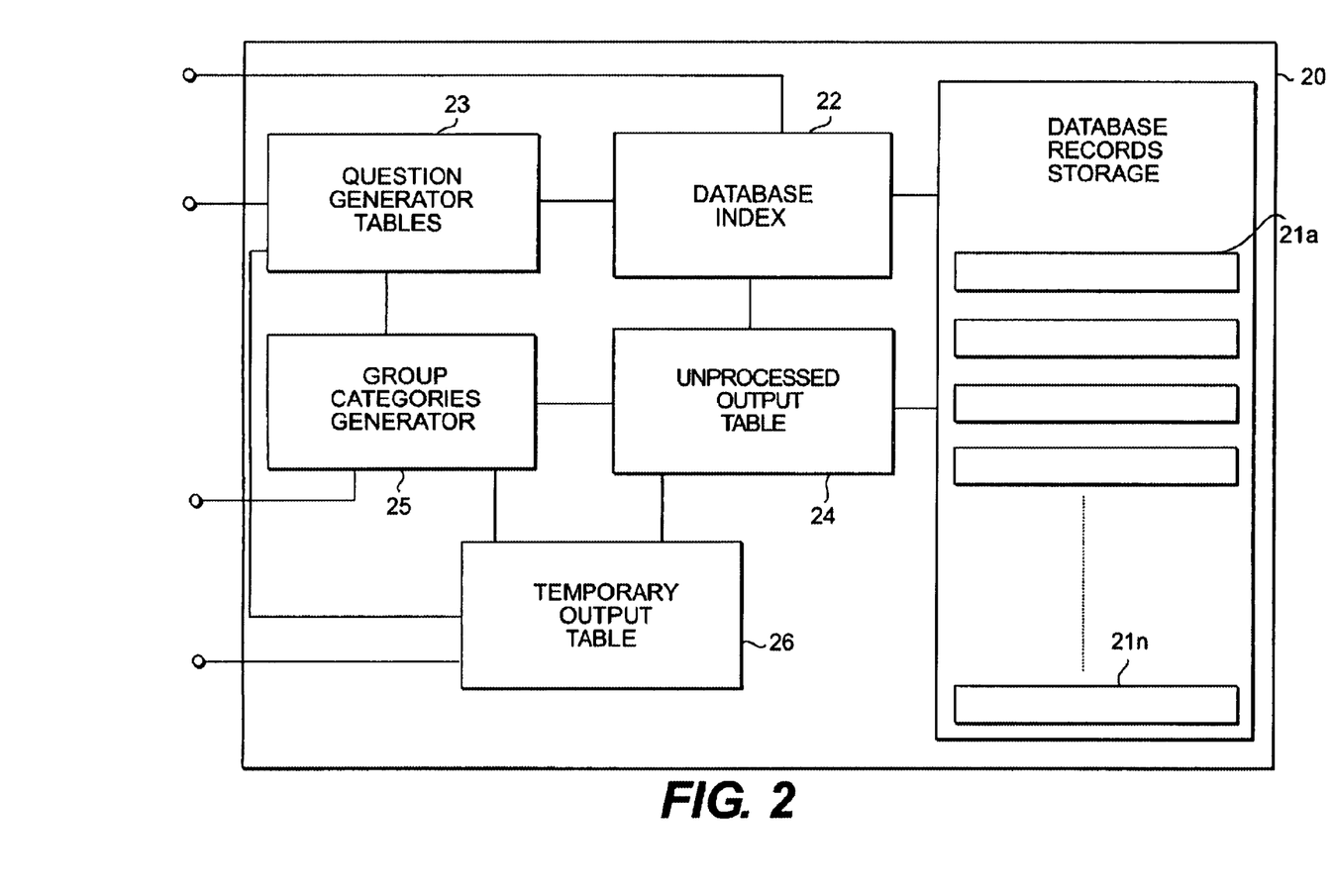
FIG. 2 is a schematic diagram of the database system stored in the memory of the computer system of FIG. 1.

FIG. 2 provides a schematic diagram of an exemplary database system 20 stored in system memory 12 of computer system 10. Database system 20 includes a database records storage unit 21, containing a multitude of records 21a–21n of information to be supplied to consumers through the information retrieval system. The database records each contain a term, such as the name of a restaurant or other business, the hours of its operation, payment methods, and any offered amenities. An example of a series of database records for an exemplary item of interest is described in further detail below with reference to FIG. 4. Database system 20 may also associate Database Records Storage Unit 21 with an index 22 for database processing. U.S. Pat. No. 5,878,423 provides a discussion concerning the interaction of a database system with an index to facilitate database processing. Information provided to computer system 10 from a user is input to index 22 to facilitate searching in the Database Records Storage Unit 21, as is known in database processing.

The database index is also in communication with Question Generator Table 23. The Question Generator Table 23 supplies questions to prompt the user for data to supply to Database Index 22 to search the Database Records Storage Unit 21. Question Generator Table 23 dynamically generates a set of questions according to scripts, or collections of potential questions associated with index categories in Database Index 22. Questions are selected from the scripts according to input received as responses to previous questions. Questions are selected from the scripts that prompt a response recognizable in Database Index 22, which narrows the search results in the Database Records Storage Unit 21. Questions generated in table 23 are output from system memory as a string of data, which is converted in I/O interface 14 of computer system 10 in a speech synthesizer to provide a digitized, automated oral communication to the user to prompt a response. The generation of a series of questions for a database search is discussed in greater detail below with reference to FIG. 5.

Database Records Storage Unit 21 is additionally connected with Unprocessed Output Table 24, which stores preliminary database search results. After a series of questions are asked according to Question Generator Table 23 and responses are interpreted in index 22, a listing of the search results are copied from Database Records Storage Unit 21 and stored in Unprocessed Output Table 24. The search results can be stored in the form of a list of data, as shown in greater detail below with reference to FIG. 6. If the number of search results to be stored is greater than the available storage space in the Unprocessed Output Table 24, a control message is sent to Database Index 22 and forwarded to Question Generator Table 23 to prompt the user with narrower questions.

Unprocessed Output Table 24 is in communication with Categories Generator 25. The Categories Generator 25 provides a list of categories in which the unprocessed output can be parsed, separated, or organized. The list of categories that are selected typically correspond with characteristics concerning the items of interest provided in the Unprocessed Output Table 24. As an example, if a user is conducting a search during the late evening, the user may be interested in whether the items of interest that are retrieved from the database or open late in the evening. The Categories Generator 25 may select to process the selected output into groups of those items of interest that are open very late into the evening, those that are closing at midnight, and those that are closed at the time of the search. As another example, the Categories Generator 25 may process the selected output according to geographical region. For example, if the system is able to detect that the user in the previous example is calling from a particular geographical intersection, the Categories Generator may select to process the selected output into groups of those restaurants that are within two miles of the intersection, those that are not within two miles of the intersection. Most commonly, the Categories Generator 25 will incorporate geographical location as a factor in selecting groupings. Another example of the selections in the Categories Generator 25 is provided below with reference to FIG. 7.

The database system 20 further includes a Temporary Output Table 26, connected to the Unprocessed Output Table 24 and the Categories Generator 25. The Temporary Output Table sorts the list of output in the Unprocessed Output Table 24 according to the groups defined by the Categories Generator 25. The results are then provided through I/O 14 to the user through a speech synthesizer. The results can be presented in a variety of different formats. For example, the system may list those results in the grouping expected to be of the most interest to the user. If this sorting method is not acceptable to the user, the user can then probe the system, through the Categories Generator 25, to re-sort the output based upon a different sorting method. As another example, the system can simply provide a brief description of the sorting method, and then probe the user for a selected group.

The index, tables, and generator described and illustrated in FIG. 2 can reside in interspersed portions of memory 12, and do not have to be physically grouped together as in the schematic diagram. The components in FIG. 2 are presented in the schematic diagram according to an information retrieval system of the preferred embodiment. Many database system configurations can be designed to perform the features described with respect to the index, tables, and generators in FIG. 2, and other such configurations are within the scope of the invention.

The method of performing a database search in the information retrieval system and providing results to the user according to a first embodiment is further described with reference to the flow diagram in FIG. 3a. The information retrieval system receives a call from a user and informs the caller of the information service in step 30. In doing so, the system provides a standard voice greeting to inform the user of available search categories and features in the system. Using speech recognition and speech synthesis, a dialogue then commences in steps 31 and 32 between the user and the system. Speech recognition is performed with Markov modeling algorithms and phoneme-based recognition, matching and comparison, with a database index populated with expected user responses.

The dialogue in steps 31 and 32 is directed by a dynamic grammar algorithm, in which a set of questions is selected from pre-generated scripts in the Question Generator Table 23. The selected questions are chosen dynamically, in that they are responsive to the input received from the user. For example, if the user indicates that she is searching for a restaurant, the system will most likely inquire about the user's desired type of food. On the other hand, if the user indicates that she is searching for a drugstore/pharmacy to fill a prescription, the system will most likely inquire about what brand pharmacy the user prefers. As a follow-up question, the system may ask about the desired location. Therefore, the system selects different questions depending upon the user's response to simulate a conversational interview.

After responses are received, the system determines in step 33 whether more information is required before conducting a database search. For example, if the user has requested a search for service stations in the region, the system might find through an initial or preliminary search that there are over a hundred businesses that fit the description. Therefore, the system will ask follow-up questions, perhaps concerning the township, the amenities, etc., in order to qualify the results list. In one embodiment of the present invention, the initial searches in step 33 are abbreviated searches in which the system only tallies the number of hits in the database according to the search terms gathered thus far.

In step 34, after receiving key input from the user, the system can now conduct a database search for the requested information. A determination is then made in step 35 as to the usability of the results. If there remains an overwhelming number of search results, the system cycles back to step 31 to prompt the user for more information to narrow the search further. The system will also cycle back to step 31 if there are no search results from the database search. Otherwise, the system determines in step 36 whether the results can now be output without further processing. If the system outputs the search results as an oral communication through a speech synthesizer, the user cannot remember information concerning more than a few businesses. However, if the output includes only three or fewer search results, the system can most likely directly output these results, in step 37 and complete the transaction in step 38.

If there are more than three search results, the system will then process and sort these results according to a selected category. Referring to FIG. 2, the information requested from the database is stored in the Unprocessed Output Table 24 at this stage. The requested information is placed into the output table according its position within the Database Records Storage Unit 21. From this information, the system will select and group database records to present to the user. The system then determines the categories for sorting the unprocessed output in step 39. In many circumstances, the system will sort the output results according geographical location. For example, a search for a car wash will likely be sorted by location. However, depending upon the dialogue in steps 31 and 32, the system may sort according to other attributes, such as amenities, hours of operation, price, brand, etc. The category determination is determined in Categories Generator 25 in FIG. 2.

From a list of possible categories, the system next selects a category by which the search results are to be sorted, in step 40. In determining the selected category, the Categories Generator 25 receives a description of the desired type of business from the Unprocessed Output Table 24, and also receives a history of the dialogue according to Question Generator Tables 23. The category is chosen that will most likely assist the user in obtaining the desired result. In one embodiment, each of the categories is associated with a different priority level, and the category is selected based on priority.

Once the category is determined by which the information will be presented, the system sorts the output into groups in step 41. The sorted output is extracted from the Unprocessed Output Table 24 and placed into the Temporary Output Table 26.

The system then determines which group is to be presented to the user, in step 42. This can be performed by prompting the user for a selection, or by automatically selecting a group. In one embodiment, the group that is the most populated with search results is selected. Alternatively, the group that is most commonly selected may be automatically chosen.

Instead of selecting a group in step 42, the user may instead provide other information to the system. In some circumstances, the user may wish for the results to be arranged according to a different category than that determined by the system. In step 43, the system detects whether the user provided the name of the category by which the results should be sorted instead of selecting a group. If the system recognizes this category, it re-selects the category in step 40, and re-sorts the search results into new groups in step 41. If the user is satisfied with the new category, the user will now select a group in step 42.

After sorting the search output into groups, and receiving or determining a selection of a group, the system re-evaluates in step 36 whether the number of search results in the selected group is a reasonable amount to present to the user. If there are still too many search results, the system selects a new category in steps 39 and 40, and re-sorts those search results that were sorted into the previously selected group into new groups that correspond to the newly selected category. This process continues until the number of search results in a selected group are sufficiently small to deliver to the user in step 37.

Figure 3A:
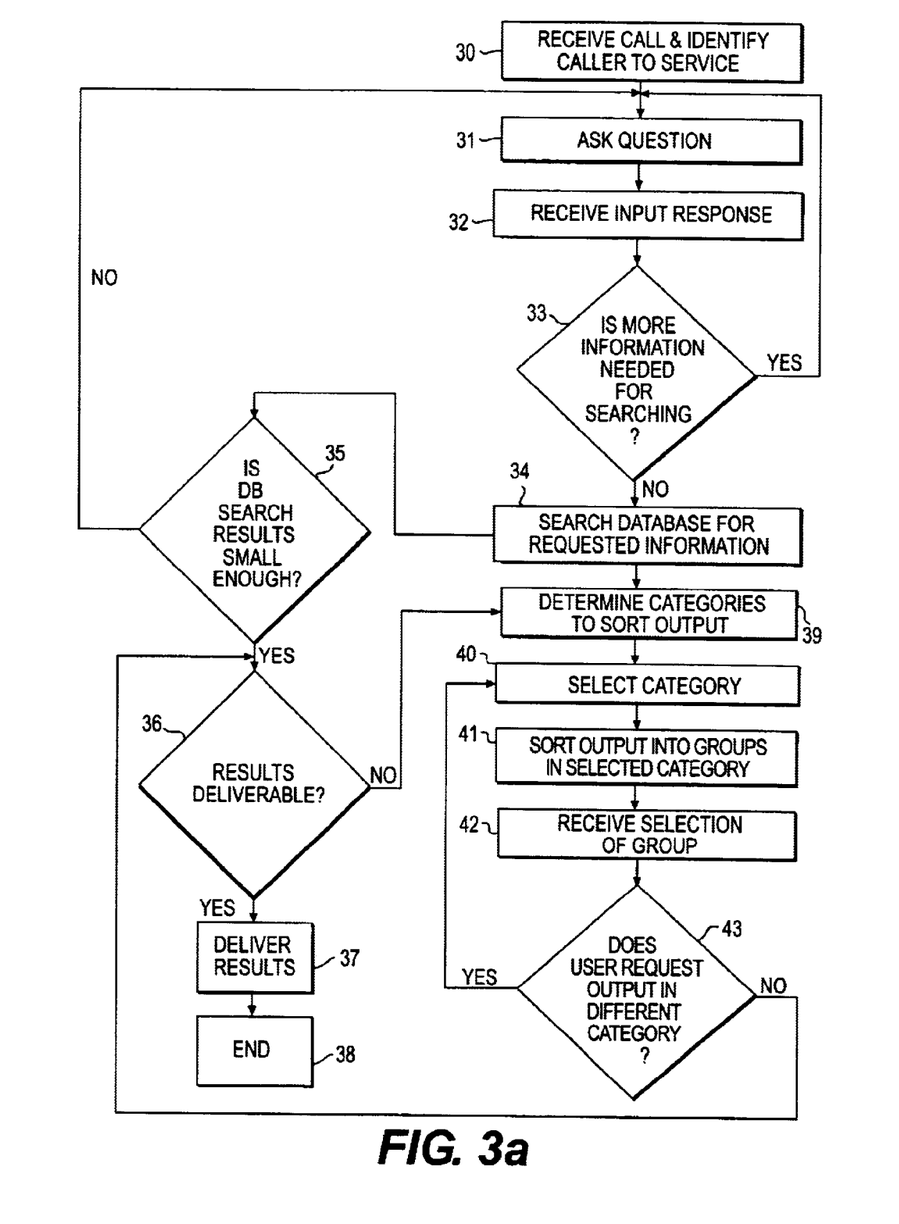
FIG. 3a is an exemplary flow diagram of the steps for conducting a database search in an information retrieval system and reporting the results to a user according to a first embodiment of the present invention.

Although the flow diagram of FIG. 3a provides one example of a method for selectively presenting output in an information retrieval system according to an embodiment of the present invention, there are many variants of this method that are contemplated to be within the scope of the present invention. For example, in another embodiment, the system omits the step of check the usability of the database search results in step 35. In another embodiment, the system does not utilize initial or preliminary database checks in step 33, but instead performs complete searches and then determines whether the results are usable in step 35.

Figure 3B:
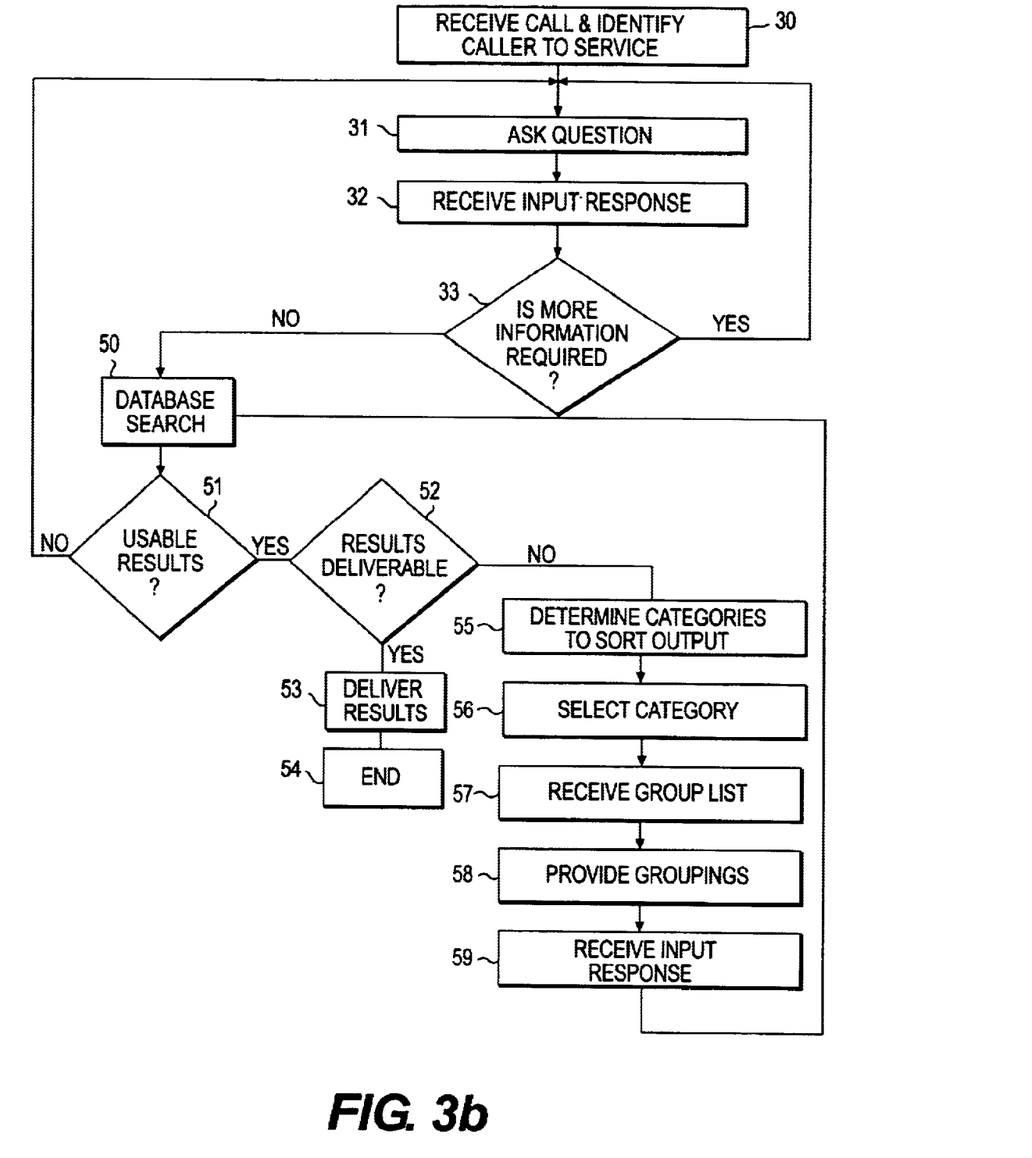
FIG. 3b is an exemplary flow diagram of the steps for conducting a database search in the information retrieval system and reporting the results to a user according to a second embodiment of the present invention.

In yet another embodiment, the system incorporates the category and group selection information determined by the Group Categories Generator as additional criteria to further narrow the database search. As shown in FIG. 3b, the steps of identifying the caller to the service, asking questions and receiving responses, performing an initial database search, and detecting whether more information is required is performed in the same manner as in FIG. 3a. In step 50, the system then performs a database search. As in FIG. 3a, the system returns to step 31 if the results from this database search are unusable. Also, if the results are usable, and the number of the results is sufficiently small to be deliverable in step 52, the system presents the results in step 53 and terminates the call in step 54. If there are more than a predetermined number of search results, the system then proceeds to determine the categories by which the output can be sorted in step 55, and then selects a category in step 56. The list of groups that correspond to the selected category is retrieved in step 57. The list of groupings are then provided to the user in step 58, and an input response is received in step 59. Using the selected category determined in step 56 and the selected group determined in step 59 as additional criteria, the system now formulates a new database search including the additional criteria, thereby returning to step 50. This process repeats itself until a reasonable number of usable search results are retrieved for the user.

Figure 4:
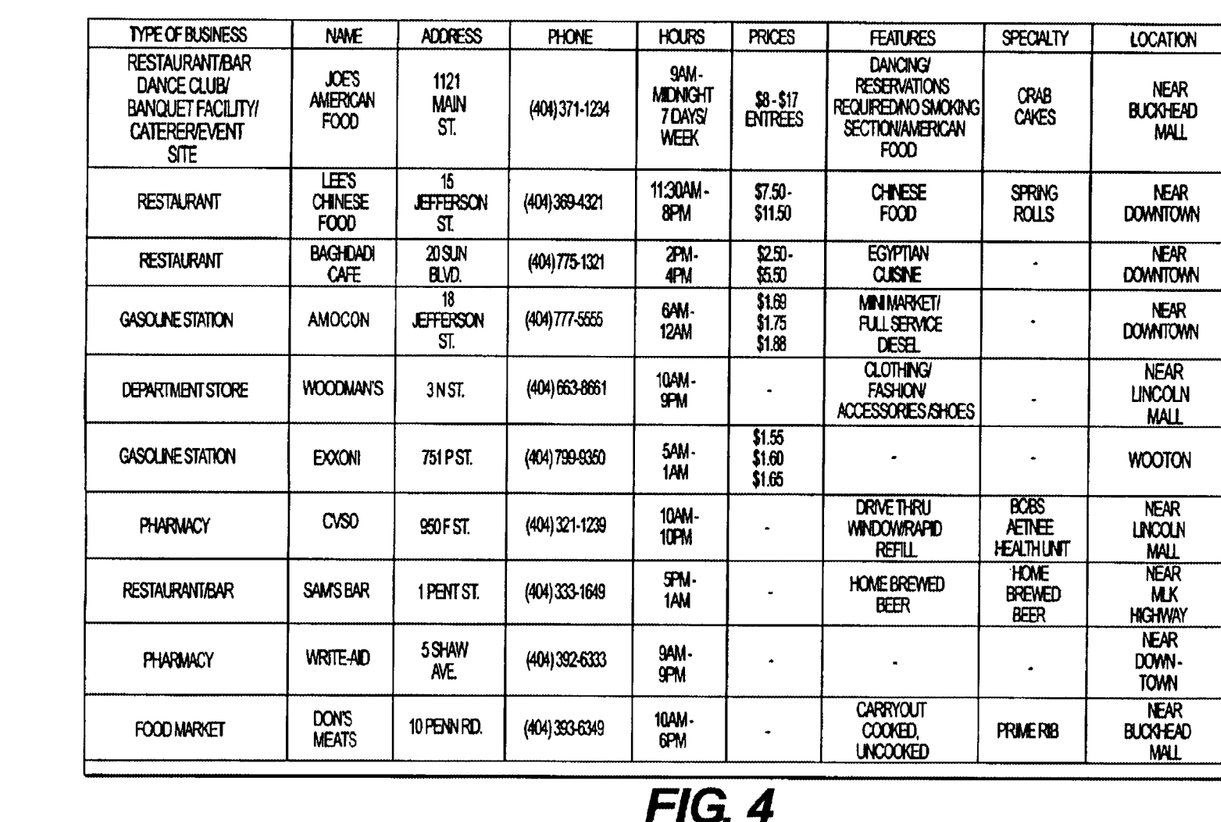
FIG. 4 is an exemplary database table of information stored in an information retrieval system according to the present invention.

FIG. 4 provides an example of information that may be contained within the Database Storage Records Unit 21 in the information retrieval system of the preferred embodiment. There are several businesses listed in the table, each of which is associated with a name, address, telephone contact, hours of operation, location, and type of business. Some businesses, such as "Joe's American Food," are associated with several types of businesses, including in this case "restaurant/bar/dance club/banquet facility/caterer/event site." Many businesses are also associated additional categories, such as a "features" category that describes the goods or services provided by the business, a "specialty" category that describes a unique attribute of the business, and a "prices" category for the business' primary products. For some businesses, such as a gasoline station, there is no information applicable to the "features" or "specialty" category.

Figure 5:
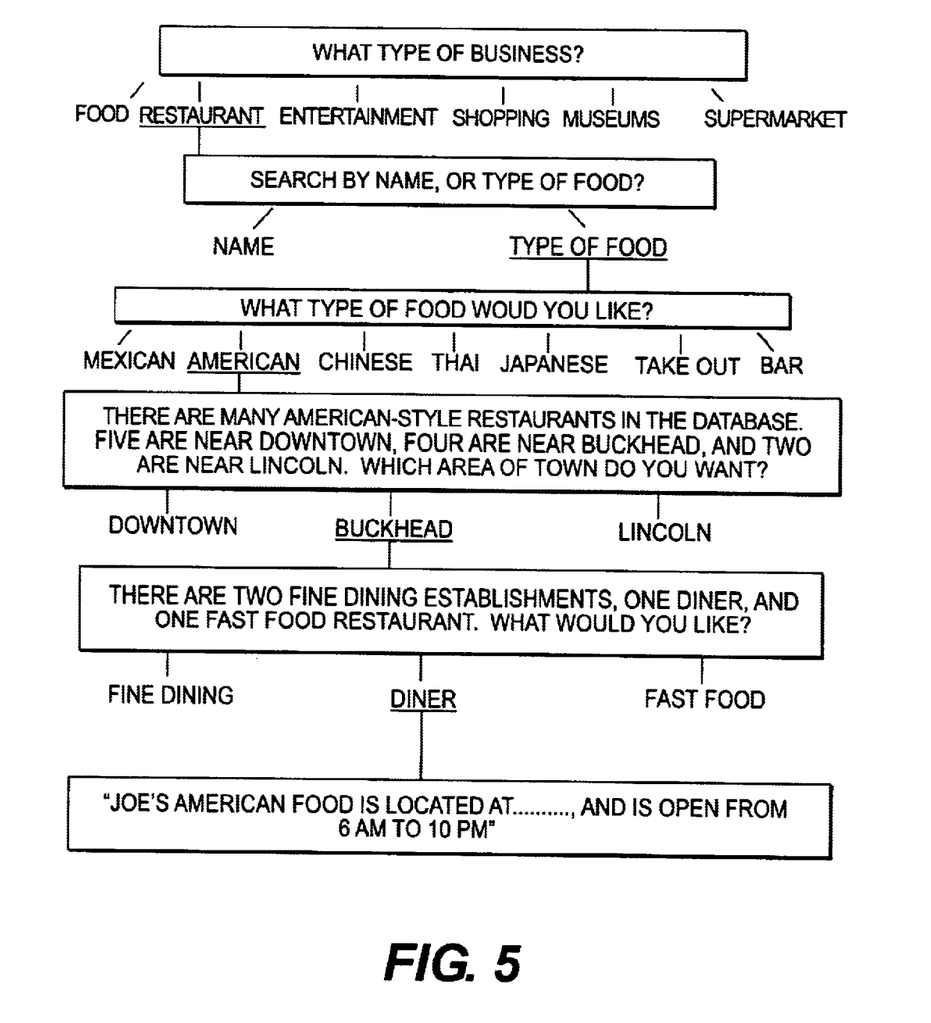

A user accesses the information in the Database Records Storage Unit by responding to questions generated in the Question Generator Table 23. FIG. 5 provides an example of a series of questions generated in the Question Generator Table 23 to perform a database search for information, such as the information provided in FIG. 4. The information retrieval system begins with a general question, such as "What type of business are you interested in?" Once this question is reported to the user, the system is configured to "expect" to hear one of the possible responses. In the example of FIG. 5, the user responds with the word "Restaurants."

The system now performs a preliminary database search for all restaurants in the database. Because there are numerous American-style restaurants in the database, the dialogue with the user continues to narrow the search.

The Question Generator then triggers the next question, "Search by name, or by type of food?" If the user knows the name of the restaurant, the user can bypass the dialogue by stating "name" and then the name of a desired restaurant. In the example provided in FIG. 5, the user responds "type of food," which triggers the question, "What type of food would you like?" As seen in FIG. 5, the system is configured to recognize one of the possible responses. In this case, the user responds by stating "American."

The system now performs a database search. The search results are extracted from Database Records Storage Unit 21 and placed into Unprocessed Output Table 24. In this example, there are eleven American-style restaurants in the database, which are too many to be reported to the user. Therefore, the system needs to sort the search results according to categories.

There are several possible categories to sort the search results of American restaurants. For example, the system could sort according to price, location, amenities, specials, size, etc. The system determines that the "location" is of the highest priority, and selects to sort according to location. The system then informs the user, "There are many American style restaurants in the suburbs. Five are near downtown, four are near Buckhead, and two are near Lincoln. Which area of town do you want?" In this example, the user indicates "Buckhead."

Figure 6:
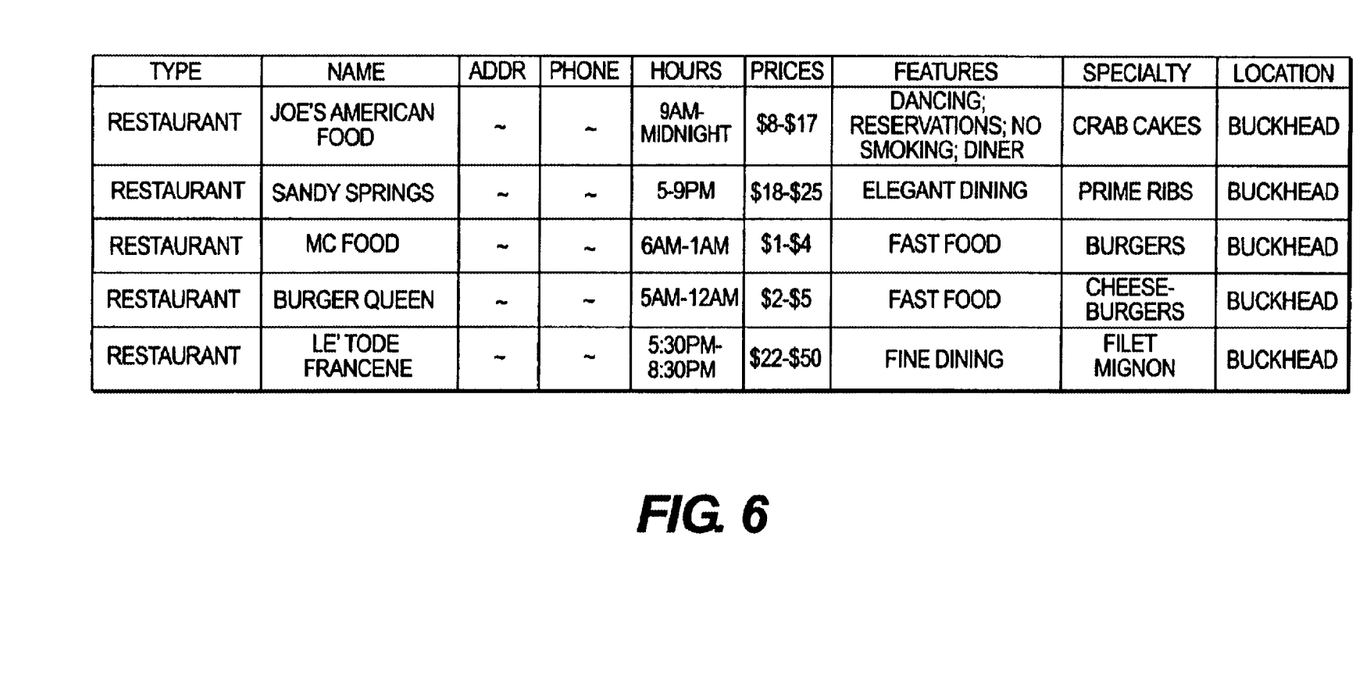
FIG. 6 is a chart of search results to be stored in temporary memory in the information retrieval system of FIG. 1.

FIG. 6 provides an example of the sorted search results. In this case, each of the five businesses is a restaurant located in Buckhead. The prices of entrees, the operating hours, the specialties, and the features for each of the restaurants vary.

Continuing the example of FIGS. 4-6, there are still too many search results to easily present to the user. In this example, the user will not be able to remember the names of each of the four restaurants that are in Buckhead. Therefore, the system needs to sort these search results according to an additional category.

Figure 7:
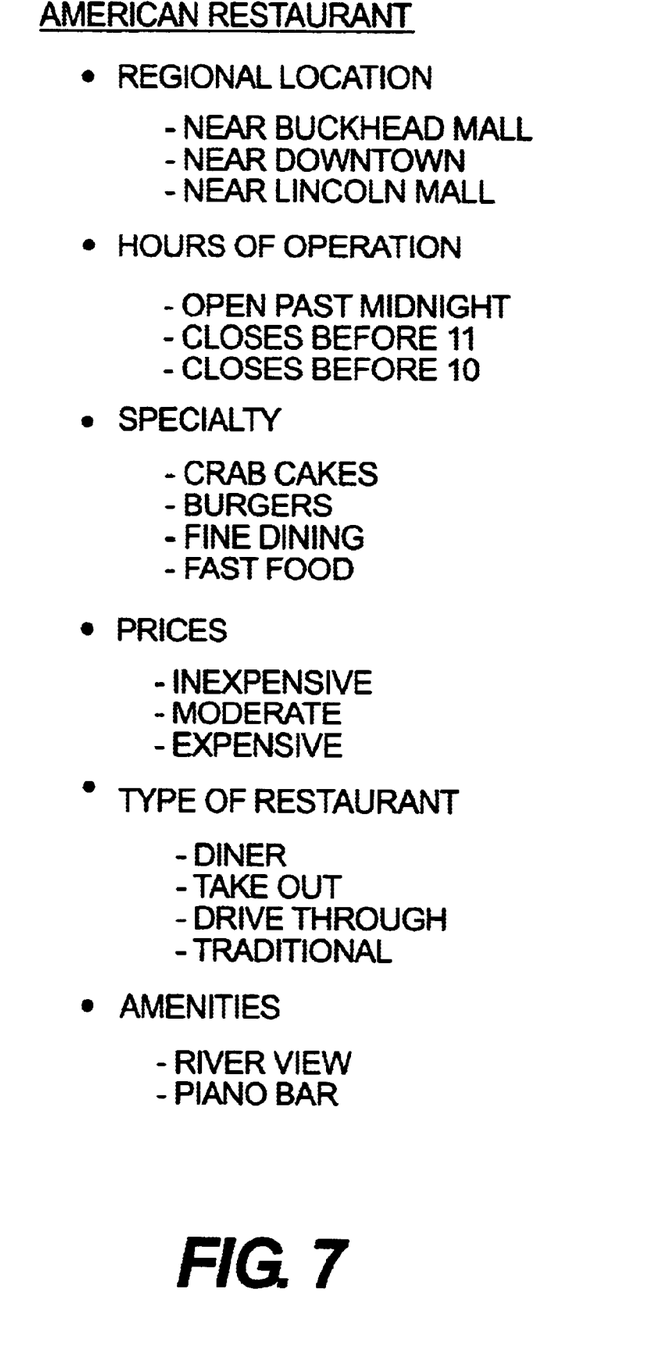
FIG. 7 is a chart of categories and respective groups for a type of business for an information retrieval system of the preferred embodiment.

FIG. 7 provides a chart of categories for selectively presenting the search results for "American restaurants." The Categories have a default order of priority that can be automatically modified based upon the search dialogue and other factors. In the current example, although the "regional location" category is typically the most relevant measure by which the results are sorted, this has already been chosen, and therefore all of the search results are in the same general location, "Buckhead." The type of restaurant is an important criteria for choosing a restaurant, and is therefore chosen.

Once the output is sorted by category, the output is again reported to the user in FIG. 5 as: "Two fine dining establishments, one diner, and one fast food restaurant." The user can then request, for example, "diner." Because there is only one diner, the system determines that the results are deliverable and understandable. The system will then report "Joe's American Food," with the address, telephone number, and directions.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. An information retrieval system for providing information about a plurality of items of interest in response to a search request, comprising:

a database records unit for storing a plurality of information about a plurality of items of interest;

a question generator table for generating a set of questions to prompt a user to provide search request parameters for searching the database records unit;

a database search engine for searching the database records unit according to a search request; and a categories generator table for generating a list of categories by which search results from the database records unit can be sorted by criteria associated with each category, wherein the number of search results within each criteria are presented, and search results of a selected criteria in a category selected from the list of categories are presented when the number of search results associated with that criteria is below a threshold amount.

2. The information retrieval system according to claim 1, wherein the question generator table contains sets of questions for each type of item of interest pertaining to features of a desired item of interest.

3. The information retrieval system according to claim 1, wherein the group categories generator contains at least one category for each type of item of interest.

4. The information retrieval system according to claim 1, wherein the group categories generator contains a plurality of categories for each type of item of interest, and wherein, for each type of item of interest, each category is associated with a priority level relative to the other categories, and the category with the highest priority level is selected for sorting the search results.

5. The information retrieval system according to claim 1, wherein the question generator table prompts a user for search request information by audio signals using a speech synthesizer.

6. The information retrieval system according to claim 1, wherein the database search engine receives search requests by audio signals, which are decoded by computerized speech recognition or natural language understanding analysis.

7. The information retrieval system according to claim 1, wherein the search results are output by audio signals using a speech synthesizer.

8. A method for selectively presenting search results from a database, comprising:
(a) generating a list of categories by which a plurality of database search results can be sorted, wherein each category includes a plurality of groups, and each of the plurality of database search results is associated with one of the groups in each category;
(b) receiving an unsorted list of database search results; and
(c) when the number of database search results is below a predetermined number, presenting the search results as output; and
(d) when the number of database search results is above the predetermined number,
(i) receiving a category from the list of categories for sorting the search results;
(ii) sorting the search results according to the groups associated with the selected category;
(iii) receiving a selection of one of the groups associated with the selected category; and
(iv) presenting the search results in the selected group.

9. The method according to claim 8, further comprising the step of eliminating categories from the list of categories for which all of the search results are sorted into the same group in the category.

10. The method according to claim 8, wherein the search results sorted into the selected group are further sorted into groups associated with another selected category to reduce the number of search results sorted into each group before presenting the search results.

11. A method for selectively presenting search results from a database, comprising:
associating each of a plurality of database search results with at least one of a plurality of categories, wherein each category includes a plurality of groups into which the database search results in the respective categories are further associated;
selecting a category from the plurality of categories;
identifying the number of search results that are associated with each group within the selected category; and
presenting search results associated with a requested group within the selected category if the number of search results in the group is below a threshold amount.

12. The method according to claim 11, further comprising the step of eliminating categories from the plurality of categories to be selected for which substantially all of the search results are associated with the same group.

13. The method according to claim 11, wherein the plurality of database search results are items of interest stored in a directory assistance information retrieval system, and each of the categories provide criteria for distinguishing between the items of interest.

14. The method according to claim 11, wherein the database search results are provided in response to a database search request generated according to search criteria determined by prompting a user to respond to a series of questions, and
the database search request is re-generated by adding additional search criteria when there are more than a predetermined number of search results in response to the database search request.

15. The method of claim 11, wherein the selected category is requested.

16. The method of claim 15, further comprising the step of presenting a subset of the plurality of categories, wherein the selected category is requested from the subset of the plurality of categories.

17. The method of claim 16, further comprising the step of assigning a priority for each of the categories, wherein the subset of the plurality of categories that are presented are selected according to the assigned priority.

18. The method of claim 11, wherein if the number of search results in the requested group is at or above a threshold amount,
selecting another category;
of the database search results in the requested group that are associated with the selected another category, presenting search results associated with a requested group within the selected another category if the number of search results in the group is below a threshold amount.

19. The method according to claim 18, wherein additional categories are selected until the number of search results in a requested group is less than a threshold number.

20. The method of claim 11, further comprising the step of identifying a calling condition of a user requesting the search results,
wherein the category is selected according to the calling condition.

21. The method of claim 20, wherein a calling condition includes time of day that the user requests the search results or location of the user.

22. The method of claim 11, further comprising the step of identifying the number of search results associated with each of the plurality of groups within the selected category.

23. The method of claim 11, wherein the number of search results that are associated with a group within the selected category may be zero.

* * * * *